No. 743,453. PATENTED NOV. 10, 1903.
V. W. CLOUGH.
TRACTION SEPARATOR.
APPLICATION FILED AUG. 23, 1898. RENEWED JUNE 22, 1901.
NO MODEL. 4 SHEETS—SHEET 1.
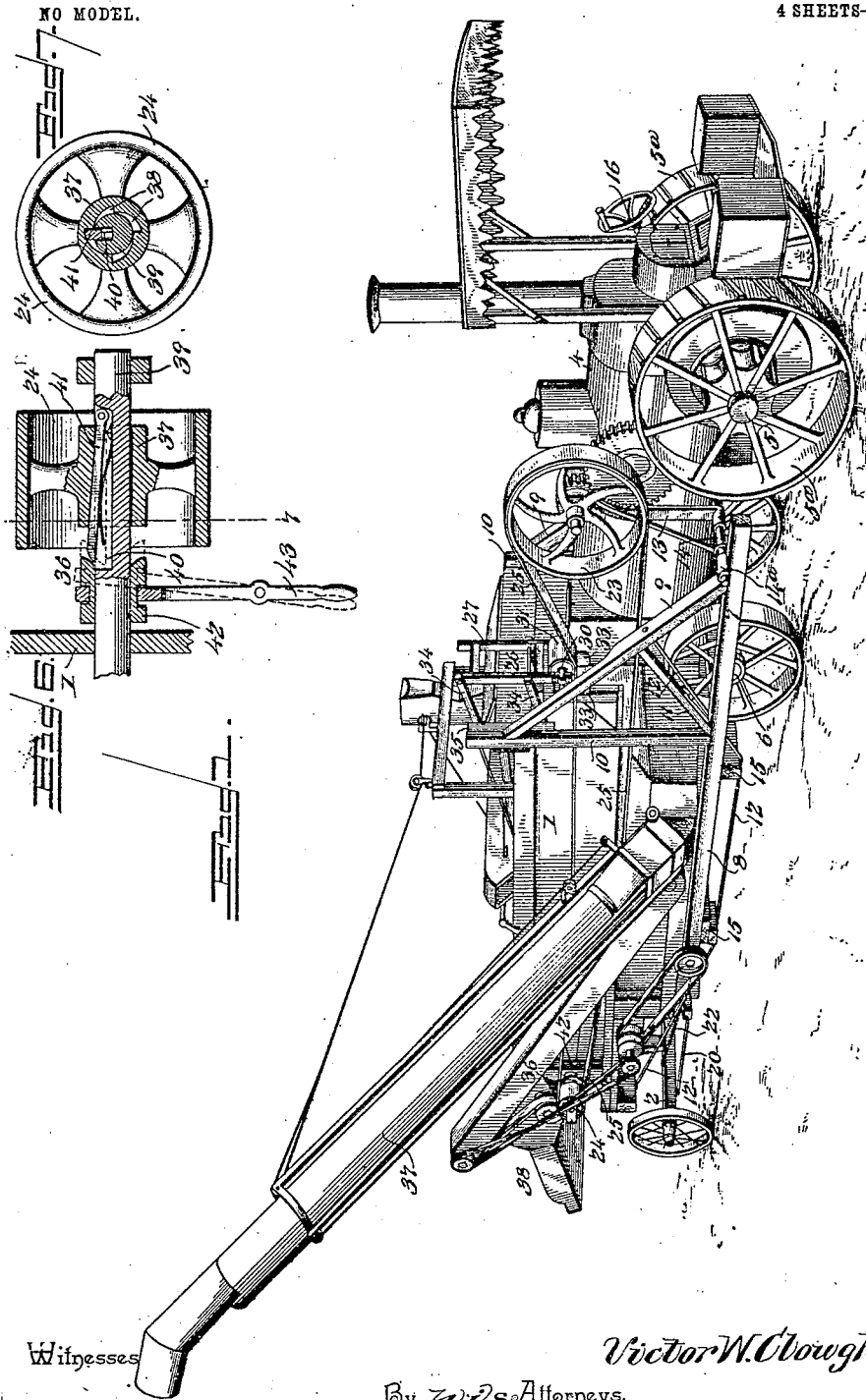
Witnesses
Victor W. Clough, Inventor
By W. W.'s Attorneys,

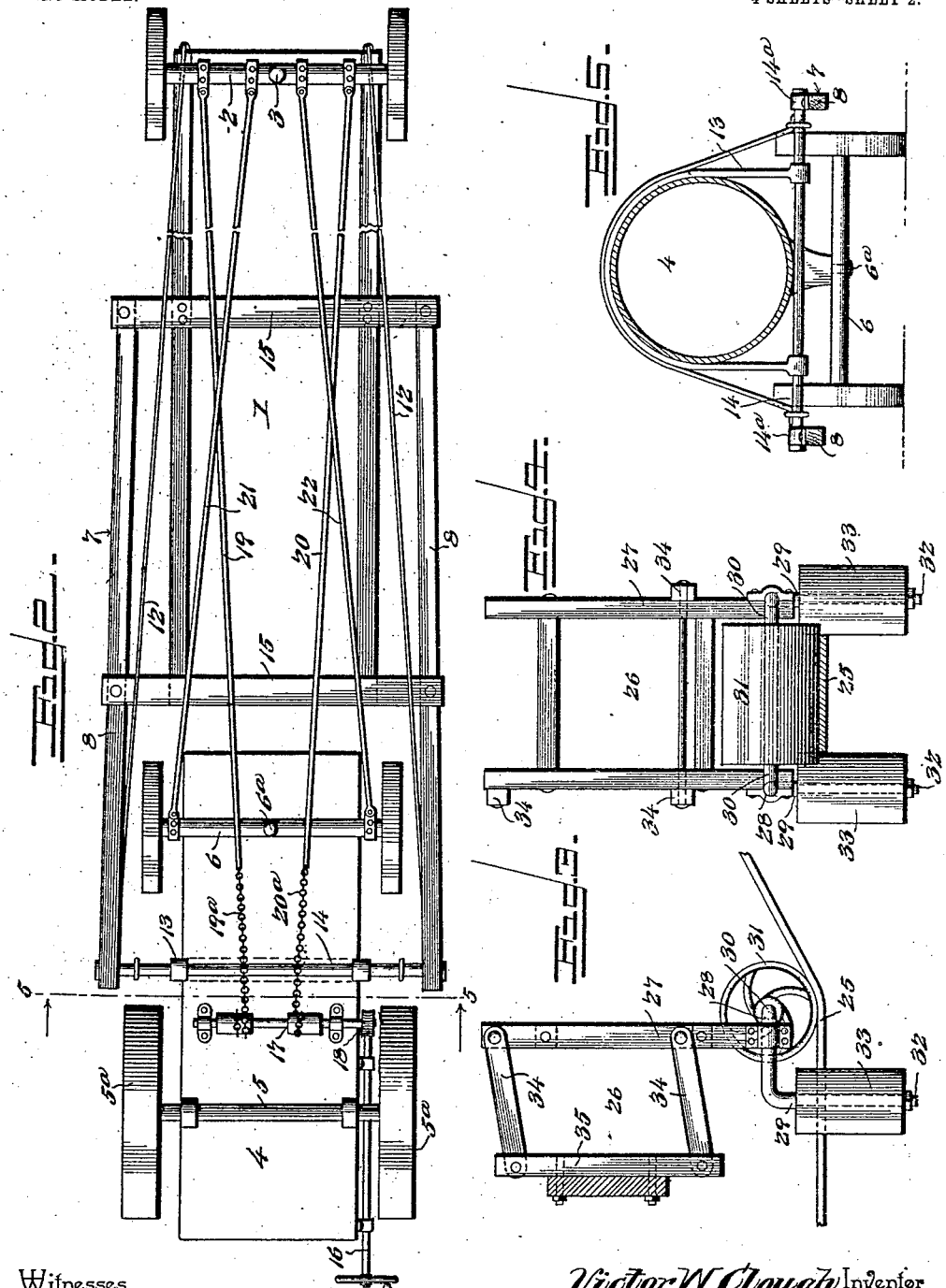

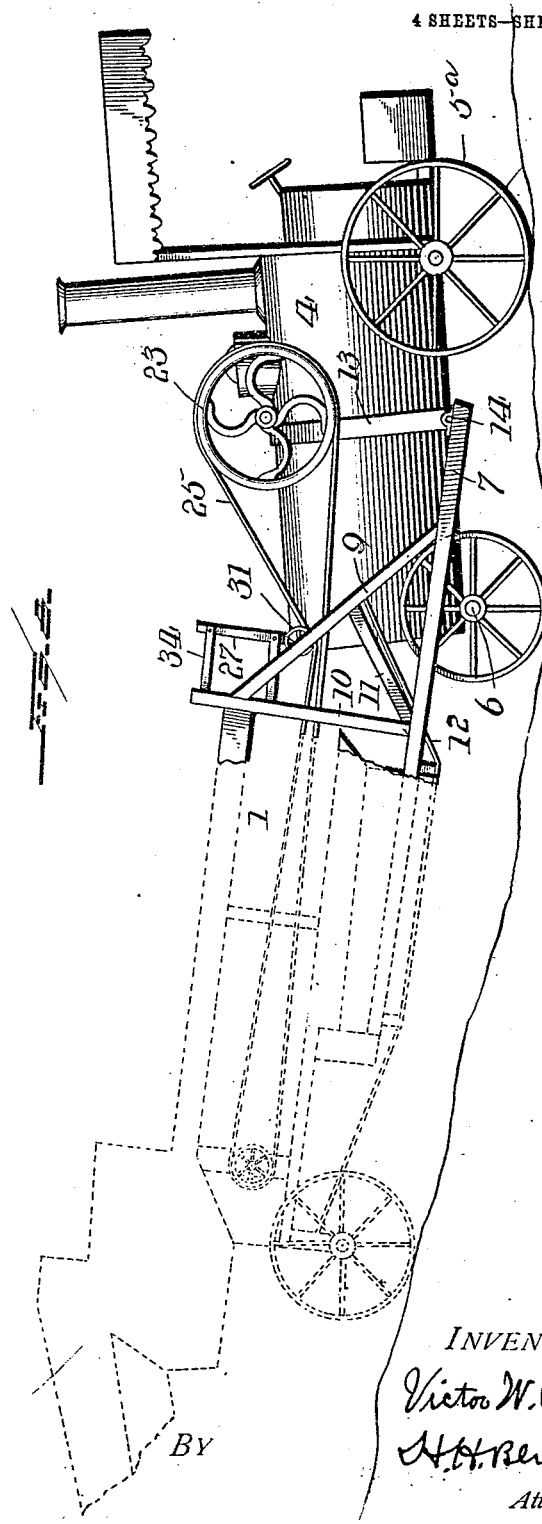

No. 743,453. PATENTED NOV. 10, 1903.
V. W. CLOUGH.
TRACTION SEPARATOR.
APPLICATION FILED AUG. 23, 1898. RENEWED JUNE 22, 1901.
NO MODEL. 4 SHEETS—SHEET 4.
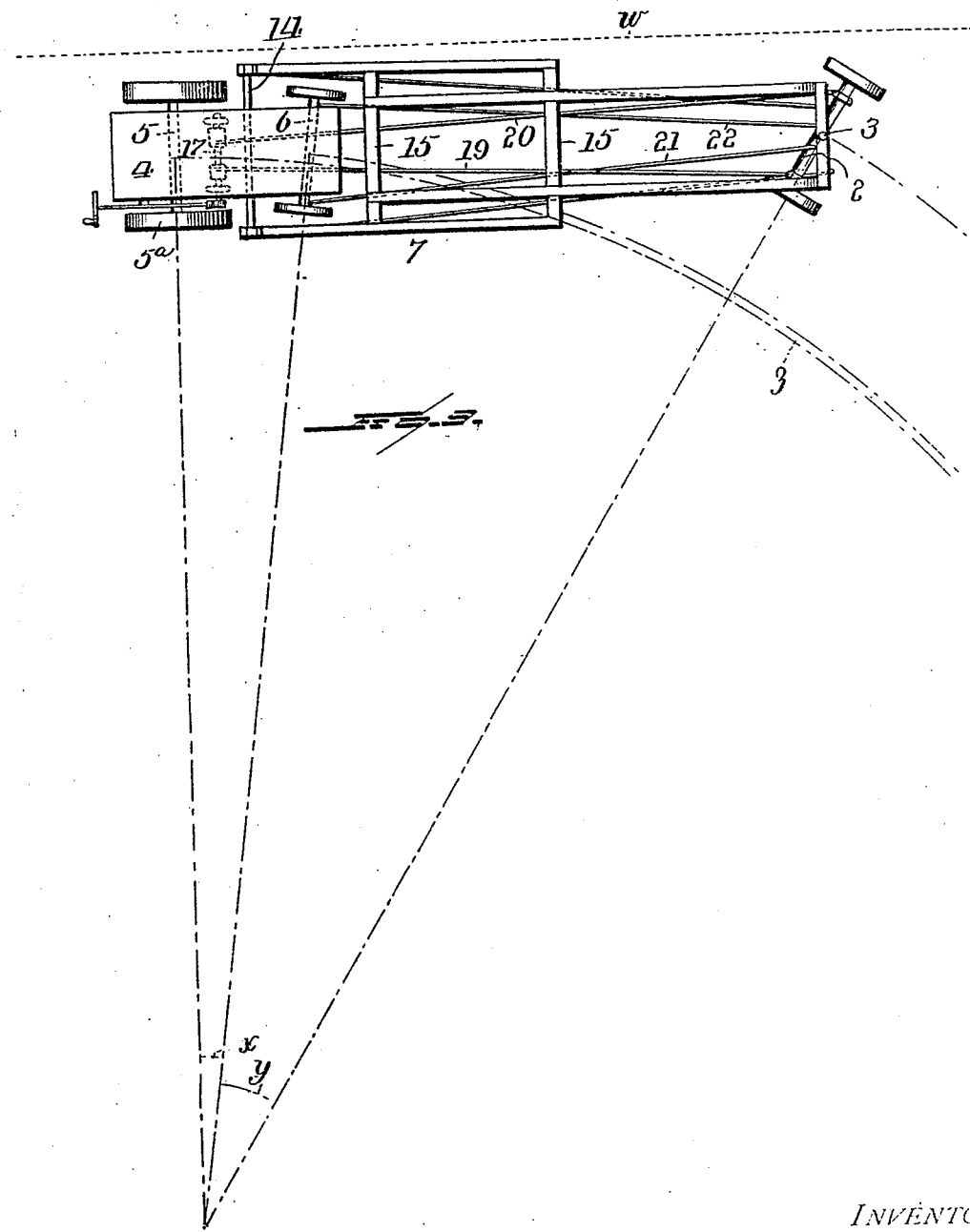
INVENTOR
Victor W. Clough
BY H. H. Bliss
Attorney
WITNESSES:
Wm. F. Doyle
N. Curtis Lammond No. 743,453.

Patented November 10, 1903.

UNITED STATES PATENT OFFICE.

VICTOR W. CLOUGH, OF GENESEO, ILLINOIS, ASSIGNOR, BY DIRECT AND MESNE ASSIGNMENTS, TO PHILIP S. HOUGHTON, TRUSTEE, OF GRAND FORKS, NORTH DAKOTA.

TRACTION-SEPARATOR.

SPECIFICATION forming part of Letters Patent No. 743,453, dated November 10, 1903.

Application filed August 23, 1898. Renewed June 22, 1901. Serial No. 65,696. (No model.)

*To all whom it may concern:*

Be it known that I, VICTOR W. CLOUGH, a citizen of the United States, residing at Geneseo, in the county of Henry and State of Illinois, have invented a new and useful Traction-Separator, of which the following is a specification.

My invention relates to a machine which I term a "traction-separator," in that it combines in a single structure a grain separator or thresher and a traction-engine which is in line with the separator or thresher and is permanently joined therewith, so that the machine is in a condition for service at all times and may be used to thresh and separate grain while traveling along a road or from one field to another.

A machine such as indicated possesses many practical advantages, which will be appreciated by threshermen, from the fact that it may be fed or supplied with grain without interruption from a belt running past or beyond the mouth and feed mechanism of the separator; that it may be run or propelled over roads and across fields in either a backward or forward direction without removing the said belt; that it may thresh the grain while traveling along the road or from one shock to another; that it may be set or moved to a stack with the wind to the end that the danger of fire is eliminated, because the wind blows the engine-sparks backward and away from the grain-stack and the straw-stack, and the employment of a long belt to slip over the pulleys for want of tension or to blow off in the wind is dispensed with, and power is thus saved by the perfect tension of the belt, thus making the machine well adapted for use in windy regions as well as all other places.

One serious difficulty encountered in a machine combining a separator and traction-engine exists in a rigid connection between the two elements, which does not allow the necessary play or movement to the parts in passing over rough roads, and to overcome this difficulty I have joined the separator and engine by substantial devices which maintain said elements in line with each other and provides for a pivotal joint in the connection between said elements. In this structure a slight oscillatory motion exists between the separator and engine, which tends to give a tightening and loosening effect to the power-belt from the engine to the threshing-cylinder, and to overcome this I have provided an automatic belt-tightener, which acts on the belt at a point between the two machines and compensates for the oscillating motion caused by the joint between said machines, which devices are particularly advantageous when the threshing or separating machine is in service during the propulsion of the combined machine over a rough road or field.

It is frequently necessary to run the machine in a backward direction, and when the separator or thresher is in use I have provided a clutch driving mechanism between the threshing-cylinder and its driving-pulley and which acts to overcome backward rotation of the threshing-cylinder on a traveling motion of the combined machine in a backward direction. This clutch may also be controlled by an operating-line to throw the threshing-cylinder into and out of gear. I have also provided a novel construction of the steering-gear by which the combined machine may be controlled and directed to turn corners or curves without cramping or binding the axles of the separator or the traction-engine; and the invention further consists in the novel combination of elements and in the construction and arrangement of parts, which will be hereinafter more fully described and claimed.

To enable others to understand the invention, I have illustrated a preferred embodiment thereof in the accompanying drawings, forming a part of this specification, and in which—

Figure 1 is a perspective view of a traction-separator constructed in accordance with my invention. Fig. 2 is a plan view illustrating the steering mechanism and the parts associated therewith. Figs. 3 and 4 are enlarged views of the automatic belt-tightener. Fig. 5 is a vertical transverse section on the line 5 5 of Fig. 2. Figs. 6 and 7 are detail views showing the clutch driving connection between the threshing-cylinder and its driving-pulley. Fig. 8 is a side elevation of the combined machine represented as passing over an uneven road-surface, many details of both the traction-engine and the separator being omitted. Fig. 9 is a plan view of the running-gear of the combined machine and of the steering mechanism, the parts being drawn to a smaller scale than in the other views.

Like characters of reference denote like and corresponding parts in each of the figures of the drawings.

The separator or thresher is designated in its entirety by the numeral 1 in the drawings, and it is constructed or equipped with a threshing-cylinder, a grain-carrier, and beater mechanism, and a cleaning-shoe similar to devices ordinary in the art for threshing the grain, separating the straw from the grain, and cleaning the chaff and refuse from the grain. As no novelty for these mechanisms is claimed in this application, I have not deemed it necessary to illustrate said mechanisms. In my machine, which combines a traction-engine with a separator or thresher in a single structure, the rear axle of the separator ordinarily provided is omitted; but I employ a front wheeled axle 2, which is arranged below the front end of the separator 1 and is coupled therewith by a vertical king-bolt 3 to enable said axle 2 to turn in a horizontal plane about the vertical bolt as a center of oscillation. The traction-engine 4 is similar in all substantial respects to structures ordinary in the art, and this engine is arranged in line with the separator 1 and closely adjacent thereto, so that the engine and the separator may be intimately and permanently coupled together to produce a single structure occupying a relatively small area as compared with the space covered by traction-engines and grain-separators when used in the ordinary manner. This traction-engine is equipped with a main axle 5, having the carrying-wheels 5ª, and with a steering-axle 6, which is pivoted on a vertical king-bolt 6ª.

One of the important features of my invention resides in the means by which the traction-engine and the separator or thresher are permanently coupled or united together, and this end is attained by the employment of a substantial frame 7, which is joined solidly to the separator 1 for the purpose of supporting the rear end thereof and is pivotally connected to or supported on the traction-engine for the purpose of allowing in the single structure a certain amount of play or vibration between the traction-engine and the separator to enable said machine to be transported readily over roads or fields without subjecting the machines to undue strain and racking, because of the length of the combined machine. The employment of this substantial frame 7 joins the engine and separator permanently together, so that said elements are always in line with each other and the structure as an entirety is constantly in a condition for immediate service, and the complete structure is mounted or supported on a six-wheeled base, which consists of a wheeled axle 2 of the separator and the wheeled axles 5 6 of the engine. This frame 7 is disposed longitudinally of the separator and engine, and it consists of the main sills 8, arranged on opposite sides of the complete machine, the vertically-inclined braces 9, the uprights or posts 10, the diagonal braces 11, and the truss-rods 12. The separator 1 is provided with a series of two or more transverse sills 15, which are firmly bolted to the longitudinal sills 8 of the connecting-frame 7. The posts 10 rise from the sills 8 at or near the rear end of the separator 1, and the braces 9 are inclined from the sills 8 near their forward ends to the post 10 near the deck of the separator. The diagonal braces 11 are between the braces 9 and the joint formed by the union of the posts 10 with the sills 8. All these parts are joined firmly together to produce a strong and compact construction adapted to sustain the weight of the separator except that portion thereof which is borne by the wheeled axle 2. The truss-rods 12 are disposed on opposite sides of the complete machine, and they extend from the front end of the separator to the inclined braces 9, said truss-rods serving to firmly bind the longitudinal connecting-frame to the separator. The longitudinal connecting-frame extends along the sides of the separator, to which it is connected, and projects beyond the rear end thereof. This frame is very rigid, having a wide base of connection with the separator and being vertically strengthened and braced by the inclined and upright bracing members which have already been described. This longitudinal frame has not only a broad base of connection with the separator, but its free extending portions are also widely separated and are suitably braced and so disposed as to provide for the transverse horizontal hinge connection with the traction-engine. In the form of my invention herein shown and described the connecting-frame is sufficiently broad to lie outside of the steering-wheels of the traction-engine, and it extends sufficiently far beyond the end of the separator to permit the said transverse hinge connection with the engine being disposed between the driving-wheels and the steering-wheels thereon.

To pivotally connect the rear end of the longitudinal connecting-frame to the traction-engine in a substantial manner, I employ a saddle or bracket 13, which is preferably of arched form and spans the traction-engine at a point intermediate of the length of its boiler. This saddle rests firmly upon and is securely fastened in a suitable way to the boiler of the traction-engine, and at its lower ends the arched saddle supports the long shaft 14. This shaft runs across under the engine and extends outwardly from the engine and saddle, so as to lie across the connecting-frame 7, and the union between the shaft and the frame-sills is effected by the bearings 14ª, which are firmly mounted on the sills and loosely receive the shaft.

From the foregoing description, taken in connection with the drawings, it will be seen that I have provided a substantial and durable connection between the separator and traction-frame, by which the elements are permanently joined, so as to maintain the engine and separator in line with each other and render the complete machine always in condition for service, and this connecting-frame serves to couple the separator with the traction-engine to allow a limited vibration or oscillation of the separator in relation to the traction-engine. The traction-engine serves to propel the separator with it when traversing a road or field, and the separator may have its working elements geared to or driven by the traction-engine, so that the operation of threshing and cleaning grain may be carried on when the machine is traveling from one place to another, as well as when the combined machine is at rest adjacent to a grain-stack.

In my traction-separator the wheeled axles 2 and 6 are connected peculiarly with the steering mechanism, so that the machine may be steered without cramping or binding the pivoted axles. The ordinary steering-rod of the traction-engine is indicated at 16; but in lieu of connecting rod directly to the pivoted engine-axle 6, as is ordinary in the art, I provide means by which the adjustment of the steering-rod is communicated first to the axle 2, and by separate connections the movement of the separator-axle is communicated to the engine-axle 6, said axles 2 6 arranged to move in unison with a view to effecting a like simultaneous adjustment of both axles. The steering-rod 16 is geared to the transverse steering-shaft 17, journaled beneath the engine 4, by means of the intermeshing gears 18, and between this transverse steering-shaft 17 and the separator-axle 2 are the longitudinal connecting-rods 19 20. The front ends of these rods 19 20 are attached loosely in a suitable way to the axle 2 near the ends thereof, and the rear ends of said rods are provided with the chains or cables 19ª 20ª, which are coiled in reverse directions around the steering-shaft 17, so that as the shaft is rotated in one direction the chain 19ª will be coiled on the shaft, while the chain 20ª will be uncoiled from said shaft to actuate the rods 19 20 in a manner to turn the axle 2 in one direction. A reverse rotation of the steering-shaft 17 serves to uncoil the chain 19ª therefrom and coil the chain 20ª thereon, and the rods 19 20 will thus turn the wheeled axle 2 in an opposite direction. The pivoted axle 6 of the traction-engine is operatively connected with the separator-axle 2 by the rods 21 22, which are properly connected with said axles and arranged to turn the axle 6 in the same direction and simultaneously with the adjustment of the axle 2. This arrangement of the shaft and connecting-rods of the steering mechanism provides for the simultaneous adjustment of the two axles 2 6, which are made to move in unison for the purpose of properly steering the machine around curves or corners.

The combined machine herein shown and described is of great length and forms a vehicle which it is difficult to manage without special steering apparatus, and such apparatus I have shown and described. By reference to Figs. 2 and 9 it will be seen that I have provided means for turning the axles of both sets of steering-wheels in the same direction and also for turning them on different arcs or to different degrees. The longitudinal connecting-rods 19 and 20 are connected with the axle 2 nearer the ends thereof than are the connecting-rods 21 and 22. These latter are connected with this axle relatively near its pivot, while they are connected with the steering-axle 6 of the traction-engine relatively near its ends. From this arrangement it follows that whenever the steering-shaft 17 is rotated it will turn both of the axles 2 and 6 in the same direction and that the angular extent to which the axle 2 is turned will be greater than the angular extent of the turning of the axle 6, this being diagrammatically illustrated in Fig. 9. In this view the axle of the steering-wheels of the traction-engine is represented as being turned to a certain extent relative to the axis of the main driving or traction wheels and designated by the angle $x$, and the axle 2 of the separator is represented as being turned to a greater angle, (designated by $y$.) This arrangement of the steering devices permits the whole machine, though of unwieldy length, to be readily steered and turned in a comparatively small circle, (indicated by the dotted lines $z$.)

Another advantage besides that of being able to turn the combined machine within a short space is incident to the arrangement of steering devices and is indicated in Fig. 9. If such a machine be placed alongside an object—such as a barn, fence, or hay-stack—and which object may be represented by the line $w$, it is possible to turn the machine as a whole away from such object. In this respect it differs from vehicles provided with the common forms of short-turning gearing in which two pairs of steering-wheels are connected so as to turn in opposite directions. In such machines the rear portion of the vehicle will move toward the object before the vehicle as a whole moves away therefrom, and it is therefore impracticable with such a gearing to place the vehicle close alongside an object unless ample space is available for moving the vehicle when it is desired to leave. Fig. 9 indicates how easily and freely a vehicle provided with my steering-gear may be turned and also moved away from an object.

The traction-engine is equipped with the usual fly-wheel 23, the shaft of which is geared in an ordinary way to the engine to be driven thereby. The threshing-cylinder of the separator 1 has its shaft provided with a driving-pulley 24, and the engine fly-wheel and thresher-cylinder shaft-pulley are operatively connected together by a belt 25, which extends lengthwise of the combined machine, is arranged within the limits of said machine, and does not extend past or beyond the mouth or feed mechanism 38 at the front end of the separator, so that the grain may be supplied to the cylinder of the separator without hindrance from the belt employed to impart the rotary motion to the threshing-cylinder.

Owing to the pivotal connection between the separator and the traction-engine due to the employment of the longitudinal frame 7 being loosely connected to the shaft 14, there is a limited amount of vibration between the engine and the separator, and when the machine is propelled along the road and the separator is in service for threshing and cleaning grain the driving-belt 25 between the engine fly-wheel and the pulley of the threshing-cylinder is liable to be slackened and loosened, according to the vibration or play between the separator and the engine. Hence the driving-belt will not operate efficiently to propel the threshing-cylinder continuously. To overcome this objection, I have provided a belt-tightener mechanism 26, which acts automatically on the driving-belt 25 at a point between the threshing-cylinder and the engine fly-wheel. This belt-tightener has a vertically-movable frame 27, which is equipped with horizontal bearings 28 and with vertical bearings 29. In the horizontal bearings 28 of the tightener-frame is journaled an idle shaft 30, carrying a horizontal pulley 31, arranged to rest directly upon the upper length of the driving-belt 25. In the vertical bearings 29 of said tightener-frame are loosely journaled the vertical shafts 32, which carry the guide-pulleys 33, arranged on opposite sides of the belt and to ride against the edges thereof. The tightener-frame is mounted or supported above the driving-belt, so as to have its tightener-pulley 31 rest directly upon the belt and utilize the gravity of the frame and pulleys to keep the belt taut, while the vertical pulleys 33 maintain the belt in alinement with the driving-pulley of the cylinder-shaft and the fly-wheel of the engine. Said tightener-frame is pivotally attached to arms 34, which are hung or pivoted to the separator 1 by suitable devices—such, for example, as a vertical bar 35, which is attached to the separator-frame—or said arms 34 may be pivoted to any suitable supporting means.

The combined machine of my invention may be propelled in either a forward or backward direction by suitable driving mechanism ordinary in the art and combined with the main axle 5 of the traction-engine. When the machine travels from one place to another in a backward direction and the separator is to be used for threshing grain while the machine is in motion, I have provided means by which the threshing-cylinder is prevented from rotating in a backward direction. This means consists of a driving-clutch connection 36 between the pulley 24 and the shaft of its threshing-cylinder. This driving-clutch connection 36 is mounted on the threshing-cylinder shaft to make the driving-pulley 24 pass through said shaft when it is rotated in one direction and the combined machine is traveling in a forward direction; but when the traction-engine moves backwardly to draw the separator after it the clutch 36 automatically frees the driving-pulley 24 on the shaft of the cylinder, so that the cylinder will not be driven in a backward direction.

In Figs. 5 and 6 of the drawings I have shown one type of clutch-driving connection between the cylinder-shaft and the driving-pulley for the threshing-cylinder; but it will be understood that I do not strictly confine myself to this particular type of driving connection. The hub 37 of the driving-pulley 24 has a series of inclined notches 38 formed therein, and the threshing-cylinder shaft 39 has a recess 40 to accommodate a spring-pawl 41, which is adapted to spring outward and take or fit in one of the notches 38 of the pulley-hub 37. One end of the spring-pawl protrudes beyond the hub of the pulley, and it is adapted to be embraced by a collar or sleeve 42, which is fitted loosely on the shaft to slide thereon, and said collar has an annular groove to receive the forked end of the lever 43, which is fulcrumed on the machine to be operated by the engineer. It is evident that one or more operating-cords may be provided for attachment to the lever and to extend along the machine to be grasped and operated by the engineer. Normally the collar is free from the pawl, and the latter is engaged with the pulley-hub, so that the latter will rotate the shaft, provided the machine is traveling in a forward direction; but should the engine be traveling in a rearward direction the pulley will ride over the pawl, and the threshing-cylinder will thus be thrown automatically out of service. In case the engineer desires to arrest the threshing-cylinder when the machine is moving forward it is only necessary to adjust the collar into engagement with the pawls, thus throwing the threshing-cylinder out of service.

I have also equipped the separator or thresher with a pneumatic-stacker mechanism 37, which may be disposed on either side of the separator, or it may be arranged on the deck thereof. This stacker, as is usual in the art, swings on vertical and horizontal axes to change the position of the stacker with relation to the machine and to the wind, and said stacker may also be turned to the rear, so as to discharge the straw adjacent to the engine, with a view to utilizing the straw as fuel for the traction-engine. The wind-tube 37 of the stacker mechanism is connected with the fan box or casing 50, which is disposed in the lower longitudinally-central portion of the separator. By arranging the stacker mechanism as shown—that is to say, with the wind-trunk projecting from the side of the machine and between the ends thereof—I am enabled to dispose of the straw without interfering with those who may be feeding the separator and without depositing it dangerously near the traction-engine.

In the service of the machine it is run or propelled in either a backward or forward direction up to the grain-stack, and, if necessary, the machine is leveled by removing the earth under the drive-wheels of the engine. The machine is now in condition for service and the straw is conveyed by the pneumatic stacker at any point in a circle around the machine. The machine is set with the wind, so as to cause the wind to blow the engine-sparks backward and away from the stacks of grain and straw, thus eliminating the danger of fire. In my machine I dispense with the long belt usually employed between the engine and separator when the parts are placed in the ordinary way with the engine at some distance from the separator. In feeding the thresher or separator the belt 25 does not interfere in any way with the deposit of the grain on the feed mechanism 38. The employment of the belt-tightener overcomes any tendency of the belt to slip, prevents the belt from being displaced on the pulleys by the wind, and compensates for the play between the separator and engine in traveling over uneven ground. In the old method of hauling a separator by a traction-engine the machine could not be transported in a backward direction; but by employing the longitudinal connecting-frame which couples the separator to the engine, so as to take up the strain lengthwise of the machine, the separator may be propelled with the engine in either a backward or forward direction, thus enabling the complete machine to be propelled through gates and around buildings. It is not necessary to remove the belt when the machine is transported from one place of threshing to another.

Changes may be made in the form of some of the parts while their essential features are retained and the spirit of the invention embodied. Hence I do not desire to be limited to the precise form of all the parts as shown, reserving the right to vary therefrom.

The separator is attached to and supported by that end of the traction-engine which rests upon the steering-wheels, and there are several important advantages incident to this arrangement, among which may be mentioned the following: By this arrangement it is possible to bring the two contiguous ends of the machines very close to each other, as it is not necessary for an attendant to occupy a position between the two machines. The combined machine is thus reduced in length to a minimum, and at the same time the feeding mechanism for the separator is situated at one extreme end of the machine, while the fire-chamber of the traction-engine is at the other end thereof, so that the danger of fire is reduced to a minimum. Another advantage incident to this arrangement is the better distribution of the weight upon the traction-engine, the separator being connected with its lighter end. When the separator is thus connected, it is possible to make a strong connecting-frame and unite it with the traction-engine without carrying the frame outside of or over the engineer's platform and the traction-wheels of the engine. These advantages are all incident to connecting the separator to the steering end of the traction-engine rather than to the end which is supported upon the driving-wheels.

Having thus described the invention, what I claim is—

1. In a traction-separator, the combination of a separator or threshing machine, a traction-engine, a coupling-frame secured rigidly to each side of the frame of the separator or threshing machine and projecting beyond one end thereof, outside the planes of the rear wheels of the engine, and means for pivotally connecting the end of the coupling-frame to the opposite sides of the traction-engine, the pivotal connection lying between the front and rear wheels of the engine, and being on a transverse horizontal axis at right angles to the combined machine, for the purpose set forth.

2. In a traction-separator, the combination of a separator or threshing machine, a traction-engine in line therewith, a coupling-frame secured rigidly to said separator, and a pivotal shaft supported transversely on the engine and connected to the frame for sustaining the latter and the end of the separator which lies contiguous to the traction-engine, said pivotal shaft lying in a horizontal position and at right angles to the axis of the combined machines, whereby the contiguous ends of the engine and separator, or either of them, may move freely in a vertical plane, substantially as described.

3. In a traction-separator, the combination of a separator or thresher supported at one end by a pivoted wheeled axle, a traction-engine contiguous to said separator and having a wheeled driving-axle, a coupling between said engine and separator, a single steering device on the engine, means connecting the pivoted axle of the separator with said steering device, another wheeled axle pivoted to the engine and connected operatively with the front axle to move in unison therewith, and power devices adapted to extend past said coupling, for driving the mechanism of the separator from said engine, substantially as described.

4. In a traction-separator, the combination of a separator or thresher supported at its front end by a pivoted wheeled axle, a traction-engine arranged contiguous to and in alinement with said separator, another wheeled axle pivoted to the traction-engine at a point contiguous to the inner end of the separator, a single steering device mounted on the engine, connections between the steering device and the pivoted axle of the separator, a joint having a transverse axis uniting said engine and separator and holding them in common vertical planes and leaving them free to move in said planes, and independent connections between the pivoted separator-axle and the pivoted traction-engine axle and arranged to move the two axles in unison, substantially as described.

5. A traction-separator consisting of a separator or thresher, a traction-engine, a longitudinal coupling-frame united firmly to the separator, a saddle or yoke supported by the traction-engine, and a horizontal shaft connecting the coupling-frame pivotally to the saddle or yoke, said shaft arranged at right angles to the longitudinal axis of the combined machines and connecting the contiguous ends of said machines to permit the same to have free movement in a vertical plane, substantially as described.

6. A traction-separator consisting of a separator or thresher, a traction-engine in line therewith, a saddle mounted firmly on the engine, a horizontal shaft supported in the saddle and arranged beneath the engine, and a frame united firmly to the separator and supported loosely on the shaft, whereby the frame is connected pivotally to the engine on a horizontal axis lying at right angles to the combined machine, substantially as described.

7. A traction-separator consisting of a separator or thresher supported at one end by a wheeled axle, a wheeled engine in line with and contiguous to the separator or thresher, a longitudinal frame having its sills united rigidly to the separator or thresher, and provided with posts and braces which are likewise united to the separator and support the inner end thereof, a saddle arranged transversely on and secured rigidly to the engine, and a transverse shaft supported in the saddle and located between the front and rear wheels of the engine and pivotally supporting the end of the longitudinal frame, for the purpose set forth.

8. In a traction-separator, the combination of a separator supported at its front end by a wheeled axle, a traction-engine equipped with a driving-axle and with a pivoted steering-axle, a longitudinal frame connecting the traction-engine and the separator, and said frame supporting the inner end of the separator, a steering-shaft on the engine having operative connections with the axle of the separator, and independent connections from the separator-axle to the pivoted axle of the engine, substantially as described.

9. In a traction-separator, the combination of a separator, a traction-engine, a coupling pivotally connecting the separator to the engine, the axis of said pivot lying in a horizontal plane and permitting the contiguous ends of the engine and separator to move in a vertical plane, a driving-belt between the fly-wheel of the traction-engine and the threshing-cylinder, and a vertically-yieldable belt-tightener device acting on the driving-belt at a point between the cylinder-shaft and the pivotal connection of the frame to the engine, said tightener device compensating for vibration or play in the driving-belt owing to the vertical movement on the pivotal connection of the engine to the separator, or vice versa, substantially as described.

10. In a traction-separator, the combination of a threshing-cylinder shaft, a driving-pulley fitted thereto and having a recessed hub, yieldable clutch-pawls arranged to engage with the hub and to make the pulley fast with the shaft when the pulley is driven in one direction, means for expanding said pawls to engage with the pulley-hub, and an adjustable collar to release the clutch-pawls from the driving-pulley, substantially as described.

11. The combination of a separator having threshing mechanism, a power-receiving device thereon for driving the said threshing mechanism, a traction-engine having power-generating devices and power-transmitting devices for driving said power-receiving mechanism on the separator, a rigid longitudinally-arranged connecting-frame connected to the separator and extending to lines beyond the rear end thereof, and a transverse horizontal hinge connecting the rear free end of said frame to the traction-engine and holding the engine and separator in the same longitudinal planes, substantially as set forth.

12. The combination of a threshing and separating machine having a frame, a housing or casing and threshing and separating devices within the frame and housing, a traction-engine, a supplemental frame built around and rigidly secured to the casing and frame of the separator and of wider horizontal dimensions and extending to transverse lines in rear thereof and in rear of the end of the traction-engine, and a horizontal transverse hinge interposed between the rear end of the said supplemental connecting-frame and the traction-engine, said relatively widened supplemental connecting-frame being adapted to brace the separator and the traction-engine against torsional displacement, substantially as set forth.

13. In a traction-separator, the combination of a traction-engine provided with traction-wheels at one end and a pair of steering-wheels at the other, a threshing and separating machine hinged to said traction-engine, a pair of steering-wheels connected with the outer end of said thresher and separator, both pairs of steering-wheels being in front of the traction-wheels, and operating mechanism connected with both said pairs of steering-wheels and adapted to cause both axes of the pairs of steering-wheels to converge toward the same point in the line of the axis of the traction-wheels and at various distances from the traction-wheels corresponding to the angles of turning of the combined machines, substantially as set forth.

14. A traction-engine having front and rear wheels combined with a two-wheeled supporting base or frame pivotally connected to the said engine between its front and rear wheels, and steering devices between the traction-engine and the wheels of the said base or frame, substantially as set forth.

15. A combined traction and separator frame formed of two parts united by a horizontal transverse pivot or hinge, a pair of traction-wheels near one end of one portion of the said frame, and a pair of steering-wheels near the other end of the said portion of the frame, the said pivot being between said pairs of wheels, another pair of steering-wheels for the other portion of the frame, and steering devices for turning the said pairs of steering-wheels simultaneously, substantially as set forth.

16. In a mechanism of the class described, the combination of a traction-engine having a pair of traction-wheels and a pair of steering-wheels, a threshing and separating mechanism having an elongated frame extending toward the traction-engine beyond the transverse vertical planes of the final straw-delivering devices, means for hinging the said frame and traction-engine on a horizontal axis and holding them in vertical planes fixed relatively to the engine, and a pair of supporting-wheels under the threshing and separating mechanism situated at the front end thereof remote from the traction-engine, substantially as described, whereby said mechanism is overbalanced relatively to its front wheels and the weight thereof is transmitted from the said elongated frame to the traction mechanism uniformly at all times, substantially as set forth.

17. In a traction-separator, the combination of a traction-engine having a power driving element, a separator having a driven element in relation to said driving element to receive power therefrom, and a joint connecting the engine and separator having a horizontal transverse axis holding the engine and separator in common longitudinal vertical planes and leaving them free to move relatively in said planes.

18. In a traction-separator, the combination of a traction-engine, a separator, a joint connecting the same, said joint having a horizontal transverse axis and holding the engine and separator in common longitudinal vertical planes, and leaving them to move freely relatively to each other in said planes, a six-wheeled base for said engine and separator comprising steering and traction wheels supporting said engine and one member of said joint, steering-wheels supporting the other member of said joint and that end of the separator remote from said joint, and steering mechanism connecting the steering-wheels of the separator with the steering-wheels of the engine.

19. In a traction-separator, the combination of a traction-engine having traction and steering wheels and power-transmitting devices, and a separator having steering-wheels near one end, a power-receiving mechanism held in fixed relation to the power-transmitting mechanism on the traction-engine, said engine and separator being arranged end to end with the steering-wheels of the separator remote from the engine and the said traction-wheels remote from the separator, a joint connecting the engine and separator having a horizontal transverse axis, holding them in common longitudinal vertical planes and leaving them free to move relative to each other, in said planes, and steering mechanism connecting the steering-wheels of the separator with the steering-wheels of the engine.

20. The combination of a threshing mechanism, having a belt-pulley, a supporting-frame for said mechanism, a power mechanism having a belt-pulley, a supporting-frame for the power mechanism, a transverse horizontal hinge-joint connecting said frames between said mechanisms and adapted to maintain the latter in the same vertical longitudinal planes during movements of said frames on said joint, and a belt-tightener adapted to engage a belt when the latter is operating on said pulleys, substantially as set forth.

In testimony that I claim the foregoing as my own I have hereto affixed my signature in the presence of two witnesses.

VICTOR W. CLOUGH.

Witnesses:
GEO. E. WAITE.
H. V. FISHER.